Patented Mar. 5, 1946

2,395,934

UNITED STATES PATENT OFFICE 2,395,934

ESTERS AND PROCESS OF PRODUCING SAME

Karl Miescher, Riehen, and Jules Heer, Basel, Switzerland, assignors to Ciba Pharmaceutical Products Inc., Summit, N. J., a corporation of New Jersey No Drawing. Original application July 17, 1939, Serial No. 285,018. Divided and this application November 15, 1943, Serial No. 510,400. In Switzerland July 21, 1938

3 Claims. (Cl. 260—457)

Inorganic esters of the dihydroxystilbenes, bearing a hydrocarbon substituent or substituents at the ethylene bridge, are described and claimed in our U. S. Patent No. 2,234,311.

The present invention relates to the manufacture of new esters by treating with an esterifying agent a phenolic compound of the polyphenylethane series having at least one aliphatic side chain branching from the ethane chain.

As parent materials there may be used any compound of the dihydroxy phenyl ethane series which contains as a substituent in $\alpha$- and/or $\alpha'$-position a saturated or unsaturated aliphatic side chain, for instance an alkyl residue or an alkylidene-residue. If there are two substituents these may be identical or different from each other. For example there may be used $\alpha:\alpha'$-diethyl-4':4''-dihydroxy-diphenylethane, $\alpha:\alpha'$-dipropyl-2':2''-dihydroxy-diphenylethane, 3:4-(4':4''-dihydroxy-diphenyl) - 2:4 - hexadiene, 2:3-(4':4''-dihydroxy-diphenyl)-1:3-butadiene, 4:5-(4':4''-dihydroxy-diphenyl)-3:5-octadiene. These parent materials may be made in a manner in itself known; see, for example, Dodds, Nature, volume 141, page 247 (1938).

Suitable esterifying agents are for example the corresponding acids themselves, their anhydrides, their halides or their esters derived from alcohols of low molecular weight (re-esterification) or the corresponding ketenes. The acid residue to be introduced may be inorganic or organic, for instance aliphatic, cycloaliphatic, aliphatic-aromatic or aromatic; it may be substituted in any desired manner and may be straight chained or branched, saturated or unsaturated, for instance useful esterifying agents are those which are adapted to introduce the residue of the following acids: acetic, propionic, butyric, crotonic, valerianic, caproic, caprylic, capric, lauric, palmitic, stearic, hexahydrobenzoic, benzoic, phenylacetic, lactic, succinic, phthalic, salicylic, formic. Other suitable esterifying agents are for instance inorganic acids, their halides, anhydrides or esters, for example phosphorusoxychloride, phosphoruspentachloride, phosphoruspentoxide, metaphosphorous acid, chlorosulfonic acid, toluene sulfonic acid and hydrogen halides. The present application is primarily concerned with protecting those di-esters wherein the acid component is a phosphoric acid or sulfuric acid radical.

The process of esterification may follow known methods; preferably condensing agents such as pyridine, or quinoline are used. However, the method may be that of Schotten-Baumann.

For obtaining partially esterified dihydroxy-compounds the completely esterified compounds may be partially saponified, for instance by means of an alkaline agent in an alcohol under mild conditions. In the operation a re-esterification may occur under the catalytic effect of the alkali so that less than the equivalent quantity of alkali may be used. The reaction is considerably accelerated with conversion into an alcohol of higher molecular weight. On the other hand the dihydroxy-compounds may be directly partially acylated. These partial esterified products may be separated if desired from simultaneously produced completely esterified compounds, for instance by means of dilute alkalihydroxide solution in the cold. The compounds obtained and containing free hydroxy groups may be again treated with an esterifying agent adapted to introduce an acid residue other than that already present, so that mixed polyesters may be obtained.

The new esters in comparison with the known hormonal active compounds without steroid character, exhibit a protracted action in the oestrus and uterus growth tests. They are useful in therapeutics.

The following examples illustrate the invention, the parts being by weight:

Example 1

1 part of $\alpha:\alpha'$-diethyl-4':4''-dihydroxy-diphenyl-ethane is allowed to stand in 15 parts of pyridine and 4 parts of acetic anhydride for 24 hours at room temperature. The mass is then mixed cautiously with cold water, whereupon $\alpha:\alpha'$-diethyl-4':4''- dihydroxy-diphenylethane-diacetate separates in crystalline form. It may be recrystallized from dilute ethanol, melting point 136–137° C.

In similar manner the acetate of $\alpha:\alpha'$-dipropyl-2':2''-dihydroxy-diphenylethane may be prepared.

Example 2

1 part of $\alpha:\alpha'$-diethyl-4':4''-dihydroxy-diphenyl-ethane is introduced into 15 parts of pyridine containing 5 parts of propionic acid anhydride and the whole is heated for some time at 110° C. and then allowed to cool and mixed with water. An oil separates which is extracted by ether, the ethereal solution being washed successively with N-sulfuric acid, water and N/10-caustic soda solution. The dipropionate remains on evaporation of the ether and may be recrystallized from aqueous ethanol; melting point 123–124° C.

To a mixture of $\alpha:\alpha'$-diethyl-4':4''-dihydroxy-diphenylethane-dipropionate with 100 parts of methanol is added in the cold drop by drop 0.1 part of potassium hydroxide in 2 parts of methanol. The whole is allowed to stand for 2 days. The methanol is now evaporated in a vacuum and the residue taken up with 10 parts of water. The aqueous solution is then extracted with ether to remove unsaponified diester. On acidifying the aqueous solution with N/2-sulfuric acid there is obtained an oil which is extracted with ether, the ethereal solution being then washed with sodium bicarbonate solution and subsequently evaporated. By crystallizing from dilute methanol there is obtained the $\alpha:\alpha'$-diethyl-4':4''-dihydroxy-diphenylethane-monopropionate.

1 part of this monopropionate is heated with 1 part of butyric anhydride in 15 parts of pyridine for 1 hour at 100° C. and the whole is allowed to rest overnight at room temperature. It is then mixed with 100 parts of water and the oil which is precipitated is extracted with ether. The ethereal solution is washed with N/sulfuric acid, water and N/10-caustic soda solution in succession and then evaporated to dryness. The residue is recrystallized from dilute methanol to obtain $\alpha:\alpha'$-diethyl-4':4''-dihydroxy-diphenylethane-propionate-butyrate.

Example 3

1 part of $\alpha:\alpha'$-diethyl-4':4''-dihydroxy-diphenylethane is dissolved in 10 parts of quinoline and to the solution there are added by drops 6 parts of caproic acid chloride; the whole is then allowed to stand at room temperature for 24 hours. It is then extracted with ether, the ethereal solution washed with dilute sulfuric acid and sodium carbonate solution in succession and evaporated to obtain the caproic acid ester of $\alpha:\alpha'$-diethyl-4':4''-dihydroxy-diphenylethane. This may be recrystallized from dilute ethanol. Melting point 96–97° C.

In an analogous manner may be made the caproate of 4:5-(4':4''-dihydroxy-diphenyl)-3:5-octadiene.

Example 4

1 part of $\alpha:\alpha'$-diethyl-4':4''-dihydroxy-diphenylethane is dissolved in 25 parts of 2 N-caustic soda solution. This solution is shaken with 2 parts of benzoyl chloride until the smell of the acid chloride is no longer detected. The benzoic acid ester produced is filtered. When recrystallized from propyl alcohol it melts at 235–237° C.

Example 5

1 part of 3:4-(4':4''-dihydroxy-diphenyl)-2:4-hexadiene is heated in 15 parts of pyridine with 5 parts of propionic acid anhydride for some time at about 50° C. The whole is then cooled and mixed with water whereby an oil is caused to separate. This is dissolved in ether and the ethereal solution is washed successively with N-sulfuric acid, water and N/10-caustic soda solution. The dipropionate remains on evaporation of the ether and may be recrystallized from aqueous ethanol.

Example 6

A solution of 1 part of $\alpha:\alpha'$-diethyl-4':4''-dihydroxy-diphenylethane in 5 parts of pyridine is added by drops to a strongly cooled solution of 2 parts of phosphorusoxychloride in 5 parts of pyridine. The mixture soon solidifies to a thick magma. It is left in ice for ½ hour and then allowed to stand for 1 hour at room temperature. Next it is poured into saturated sodium bicarbonate solution and unconsumed parent material is extracted by means of ether. By acidifying the aqueous liquid the phosphoric acid di-ester is precipitated in the form of a white voluminous powder. By reprecipitation this ester may be further purified.

1 part of the primary phosphoric acid ester thus obtained is dissolved in 5 parts of water and there are added 0.2 part of sodium hydroxide in 1.25 parts of water. The clear solution is now evaporated to dryness in a vacuum whereby the water-soluble sodium salt of the ester is obtained.

In an analogous manner the secondary and tertiary phosphoric acid di-esters may be obtained.

The manufacture of the phosphoric acid di-ester of 3:4-(4':4''-dihydroxy-diphenyl)-2:4-hexadiene and its alkali salts falls on the same lines.

This application is a division of our application Serial No. 285,018, filed July 17, 1939.

What we claim is:
1. The phosphoric acid di-esters of $\alpha:\alpha'$-diethyl-4':4''-dihydroxy-diphenylethane.
2. The primary diphosphate of $\alpha:\alpha'$-diethyl-4':4''-dihydroxy-diphenylethane.
3. A compound selected from the group consisting of the phosphoric and sulfuric acid di-esters of $\alpha:\alpha'$-dialkyl-dihydroxy diphenyl ethane and of $\alpha:\alpha'$-dialkenyl-dihydroxy diphenyl ethane.

KARL MIESCHER.
JULES HEER.